United States Patent
Hecht

[11] Patent Number: 5,957,631
[45] Date of Patent: Sep. 28, 1999

[54] CUTTING TOOL ASSEMBLY AND A REPLACEABLE CUTTING HEAD FOR USE THEREIN

[75] Inventor: Gil Hecht, Hadera, Israel

[73] Assignee: Iscar Ltd., Migdal Tefen, Israel

[21] Appl. No.: 09/086,532

[22] Filed: May 29, 1998

[30] Foreign Application Priority Data

May 29, 1997 [IL] Israel ......................................... 120948

[51] Int. Cl.$^6$ ...................................................... B23B 51/02
[52] U.S. Cl. ......................... 408/144; 81/176.2; 408/226; 408/230; 408/713
[58] Field of Search .................................. 408/144, 231, 408/226, 713, 227, 230, 232; 81/176.2, 120

[56] References Cited

U.S. PATENT DOCUMENTS

| | | | |
|---|---|---|---|
| 2,259,611 | 10/1941 | Burger | 408/230 |
| 3,548,688 | 12/1970 | Kuch | 408/230 |
| 4,160,616 | 7/1979 | Winblad . | |
| 5,338,135 | 8/1994 | Noguchi et al. . | |
| 5,423,640 | 6/1995 | Lindblom et al. . | |
| 5,425,604 | 6/1995 | Scheer et al. . | |
| 5,599,145 | 2/1997 | Reinauer et al. . | |
| 5,607,263 | 3/1997 | Nespeta et al. . | |

FOREIGN PATENT DOCUMENTS

| | | |
|---|---|---|
| 0 118 806 | 9/1984 | European Pat. Off. . |
| 0 216 064 | 4/1987 | European Pat. Off. . |
| 0 742 065 A2 | 11/1996 | European Pat. Off. . |
| 0742065 | 11/1996 | European Pat. Off. . |
| 94340 | 9/1896 | Germany . |
| 2246965 | 4/1974 | Germany ............... 408/144 |
| 42 39 311 C2 | 4/1996 | Germany . |
| 196 05 157 A1 | 5/1996 | Germany . |
| 195 43 233 | 5/1997 | Germany . |
| 219479 | 7/1924 | United Kingdom . |
| WO 96/11079 | 4/1996 | WIPO . |
| WO 96/27469 | 9/1996 | WIPO . |
| WO 98/10881 | 3/1998 | WIPO . |

*Primary Examiner*—Daniel W. Howell
*Attorney, Agent, or Firm*—Pennie & Edmonds LLP

[57] ABSTRACT

A cutting tool assembly for rotary cutting operations comprising a replaceable cutting head and a tool shank, having a common longitudinal axis and mating peripheral surfaces. The cutting head has a cutting head mounting portion at a trailing end thereof and the tool shank has a cutting head receiving portion at a front face thereof. The cutting head mounting portion and the cutting head receiving portion of the tool shank each have at least two coupling portions bound by assiciated peripheral surfaces of the cutting head and the tool shank and mating in shape and dimensions. Each coupling portion has a base surface, a torque transmission wall and a fixation wall, the fixation wall of each cutting head coupling portion having an angular extension smaller than a corresponding angular distance between adjacent extremities of the fixation walls of two different tool shank coupling portions. The cutting tool is assembled by initially disposing the cutting head mounting portion in such a manner relative to the cutting head receiving portion as to insert the fixation walls of the cutting head coupling portions between the respective fixation walls of the tool shank coupling portions, and subsequently rotating the cutting head relative to the tool shank until the cutting head coupling portions fully overlie the corresponding tool shank coupling portions with their base surfaces and torque transmitting walls abutting each other and their fixation walls co-axially interacting in an interlocking male-female fashion, providing thereby the self-clamping of the cutting head on the tool shank.

23 Claims, 16 Drawing Sheets

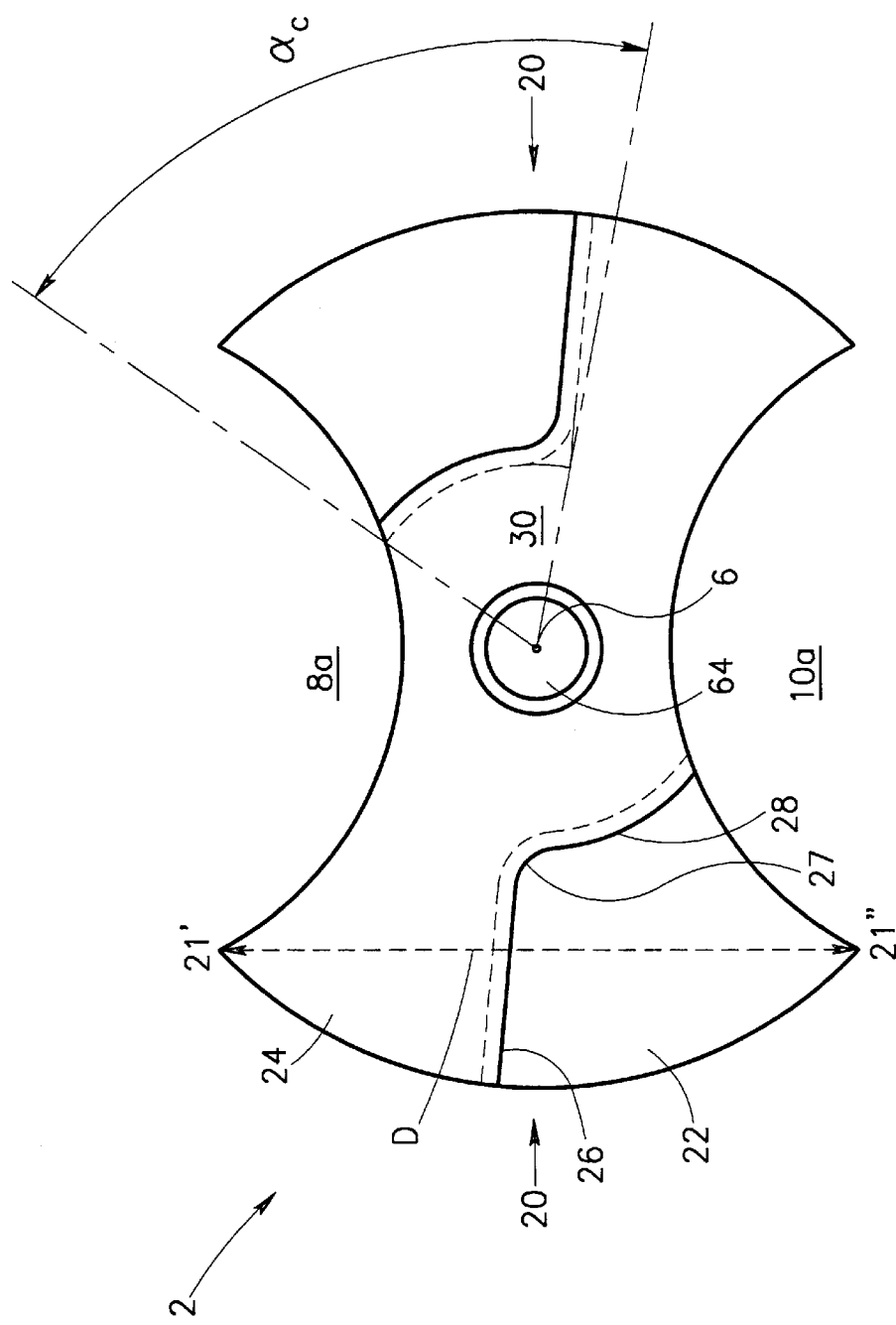

CUTTING TOOL ASSEMBLY AND A REPLACEABLE CUTTING HEAD FOR USE THEREIN

FIELD OF THE INVENTION

The present invention refers to a tool assembly comprising at least two members releasably coupled together in such a manner as to enable transfer of a rotary torque from one member to another. The invention particularly refers to a cutting tool assembly comprising a replaceable cutting head and a tool shank on which the cutting head is mounted, for use in rotary cutting operations such as drilling, milling and the like.

BACKGROUND OF THE INVENTION

One example of a rotary cutting tool assembly having a coupling arrangement of the above-specified kind is disclosed in EP 0742065. The assembly comprises first and second assembly components having interfitting male and female coupling members formed at their interacting faces, the coupling members having radially directed arm portions for torque transmission, and a centering portion located therebetween. The cutting tool is assembled by inserting the male coupling member within the female coupling member and coaxially coupling them together by a fastening screw.

The use of fastening screws in cutting tool assemblies of the above kind weakens the cutting tool and puts rather severe limitations on the miniaturization of the tool as far as cutting tools of small diameters are concerned, especially when these tools have axially extending chip flutes, and, consequently, do not have a cross-sectional area sufficiently large and a tool body sufficiently strong to accommodate appropriate fastening screws.

The problem is still more critical when rotary cutting tools are concerned, which have exchangeable cutting heads with a cutting edge extending to the center of the cutting tool, since it is inconceivable to secure such cutting heads by means of a central axial through-going fastening screw.

EP 0118 806 discloses a drilling tool assembly comprising a cylindrical tool shank formed with two chip flutes extending generally along a longitudinal axis thereof and a replaceable plate-like drilling head mounted thereto in a self-holding manner not requiring a fastening screw. The drilling head comprises two diametrically disposed substantially planar cutting portions in the form of cutting plates and the tool shank has a drilling head receiving slot defined between two diametrically disposed and radially oriented recesses formed at side surfaces of the chip flutes and extending therealong in the axial direction, the recesses mating with and being capable of receiving the cutting plates of the drilling head. The cutting plates and the recesses have narrow base surfaces oriented substantially perpendicular to the longitudinal axis of the tool and adapted to provide the axial support of the cutting head in the tool holder, and high side walls oriented transversely to the base surfaces and functioning as torque transmission walls.

It should be noted that, in the drilling tool as above, the relatively small width of the base surfaces is insufficient to withstand axial forces exerted on the tool during cutting operations. Furthermore, the drilling head with an elongated planar configuration as above is weak, when employed under torsion conditions. Furthermore, such tools have a small base area relative to the cross-sectional area of their tool shank and also relative to the height of their torque transmission walls, which leads to their instability. At least for these reasons, the drilling head of the above planar design is hardly applicable to small and, particularly, to miniature cutting tools.

It is the object of the present invention to provide a new cutting tool assembly and a new cutting head for use therein.

SUMMARY OF THE INVENTION

In accordance with one aspect of the present invention, there is provided a cutting tool assembly for rotary cutting operations comprising a replaceable cutting head and a tool shank, having a common longitudinal axis and mating peripheral surfaces;

said cutting head having a cutting portion adjacent a leading end and a cutting head mounting portion adjacent a trailing end thereof, and said tool shank having a cutting head receiving portion formed at a front face thereof, said cutting head mounting portion and the cutting head receiving portion of the tool shank each having at least two coupling portions, the cutting head coupling portions and the tool shank coupling portions being bound by said peripheral surfaces and mating in shape and dimensions;

each coupling portion having a base surface extending transversely to said longitudinal axis and adapted for participating in an axial support of the cutting head in the tool shank, a torque transmission wall extending in a generally radial direction relative to said longitudinal axis and oriented transversely to said base surface, and a fixation wall disposed adjacent and extending transversely to the torque transmission wall and circumferentially relative to said longitudinal axis, the fixation wall of each cutting head coupling portion having an angular extension smaller than a corresponding angular distance between adjacent extremities of the fixation walls of two different tool shank coupling portions;

the cutting tool being assembled by initially disposing the cutting head mounting portion in such a manner relative to the cutting head receiving portion as to insert the fixation walls of the cutting head coupling portions between the respective fixation walls of the tool shank coupling portions, and subsequently rotating the cutting head relative to the tool shank until the cutting head coupling portions fully overlie the corresponding tool shank coupling portions with their base surfaces and torque transmitting walls abutting each other and their fixation walls co-axially interacting in an interlocking male-female fashion, providing thereby the self-clamping of the cutting head on the tool shank.

Preferably, the cutting head coupling portions and the tool shank coupling portions have mating stepped configurations, each having a pair of base surfaces of which one surface is raised and the other one is lowered, the base surfaces merging via said torque transmission wall. Preferably, each coupling portion is in the form of a protrusion comprising the raised base surface and a recess comprising the lowered base surface.

When the cutting tool is designed for cutting operations of the kind requiring chip evacuation flutes, such as, for example, drilling, the number of coupling portions in the cutting head and the tool shank preferably corresponds to the number of the flutes. In this case, each coupling portion extends between two neighboring flutes so that its lowered surface is bound by one of the flutes and the torque transmission wall and its raised surface is bound by the other flute and the torque transmission wall.

In accordance with another aspect of the present invention, there is provided a replaceable cutting head for mounting on a tool shank having a front cutting head receiving portion formed with at least two coupling portions each bound by a tool shank peripheral surface and formed with a base surface, a torque transmission wall and a fixation wall;

said cutting head having a peripheral surface mating with said tool shank peripheral surface, a cutting portion adjacent a leading end and a cutting head mounting portion adjacent a trailing end thereof, the cutting head mounting portion being formed with at least two coupling portions bound by said peripheral surface of the cutting head;

each coupling portion of the cutting head having a longitudinal axis and a base surface extending transversely to said longitudinal axis and adapted for participating in an axial support of the cutting head in the tool shank, a torque transmission wall extending in a generally radial direction relative to said longitudinal axis and oriented transversely to said base surface, and a fixation wall disposed adjacent and extending transversely to the torque transmission wall and circumferentially relative to said longitudinal axis, the fixation wall of each cutting head coupling portion having an angular extension smaller than a corresponding angular distance between adjacent extremities of the fixation walls of two different tool shank coupling portions.

When the tool shank on which the cutting head is to be mounted has chip flutes, it is preferable that the cutting head is formed with chip flute sections, which merge continuously with the chip flutes of the tool shank. Thereby, the entire assembly has a complete smooth design and the continuous chip flutes thereof enable very smooth chip evacuation.

The tool assembly according to the present invention may further be provided with a securing arrangement, e.g. in the form of a slit in a tool shank, for resiliently securing the cutting head thereon.

The coupling arrangement according to the present invention allows the cutting head and the tool shank to have strong wide ends with a maximal available cross-sectional area and low torque transmission walls, whereby the stability of the cutting tool assembly is improved. The coupling arrangment also enables transmission of large torque from the tool shank to the cutting head, and is capable of withstanding large axial forces encountered thereby during cutting operations such as drilling. The coupling arrangement of the present invention is particularly useful for miniature cutting tool assemblies, especially when such assemblies are provided with chip evacuation flutes.

A still further aspect of the present invention is connected with a device for assembling and dissembling the cutting tool assembly defined above.

BRIEF DESCRIPTION OF THE DRAWINGS

For a better understanding of the present invention and to show how the same may be carried out in practice, reference will now be made to the accompanying drawings, in which

FIG. 3 is a plan bottom view of the cutting head shown in FIG. 2;

FIG. 4b is an isometric partial view of an alternative embodiment of the tool shank shown in FIG. 4a;

DESCRIPTION OF THE PREFERRED EMBODIMENTS

Figure 1:
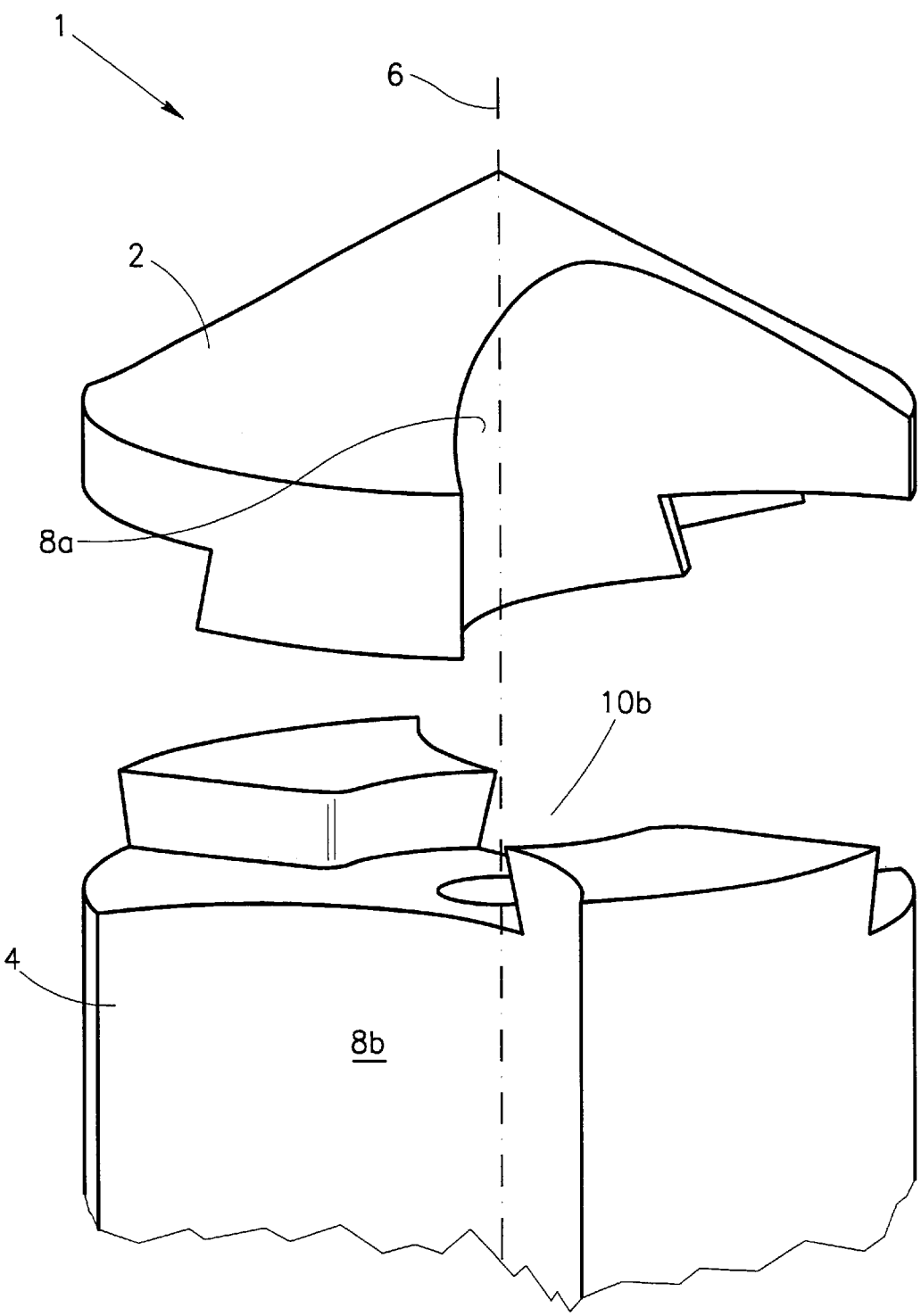
FIG. 1 is an isometric exploded view of a cutting tool assembly, before its assembling, according to one embodiment of the present invention.
Figure 9:
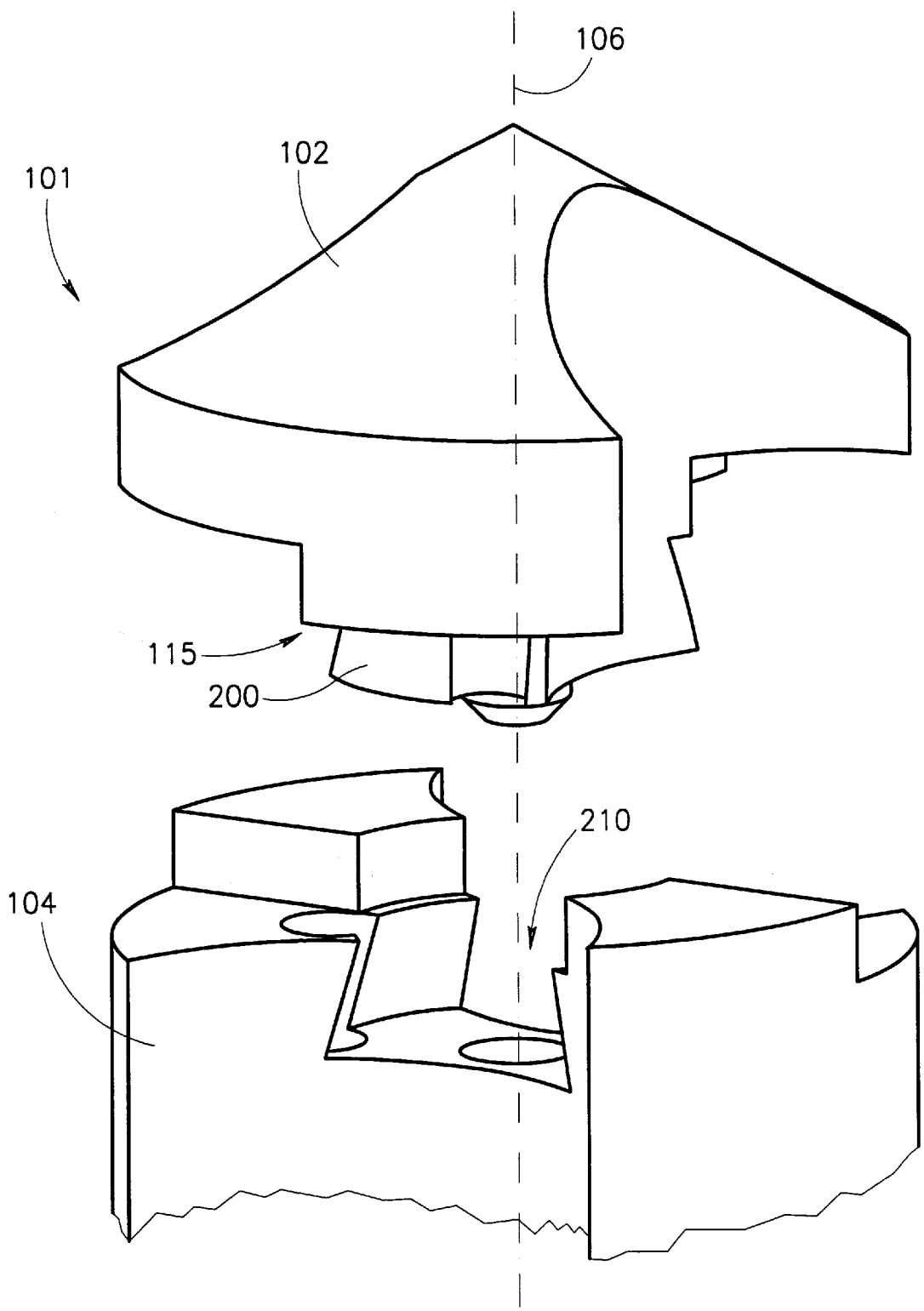
FIG. 9 is an isometric exploded view of a cutting tool assembly, before its assembling, according to another embodiment of the present invention.

A cutting tool assembly according to the present invention, for use in drilling operations, is generally illustrated in FIGS. 1 and 9.

The cutting tool assembly 1 shown in FIG. 1 comprises a replaceable solid cutting head 2 of a throw-away type and a tool shank 4 having a longitudinal axis 6 and 180°-rotational symmetry with respect to the longitudinal axis 6, adapted for being assembled in a self-clamping manner.

The cutting head 2 and the tool shank 4 are formed with respective chip flute sections 8a, 10a and 8b, 10b such that, when the cutting tool is assembled, the sections 8a and 8b and the sections 10a and 10b form continuous, preferably helical, flutes 8 and 10 which extend from the cutting head 2 to a rear of the tool shank 4.

Figure 2:
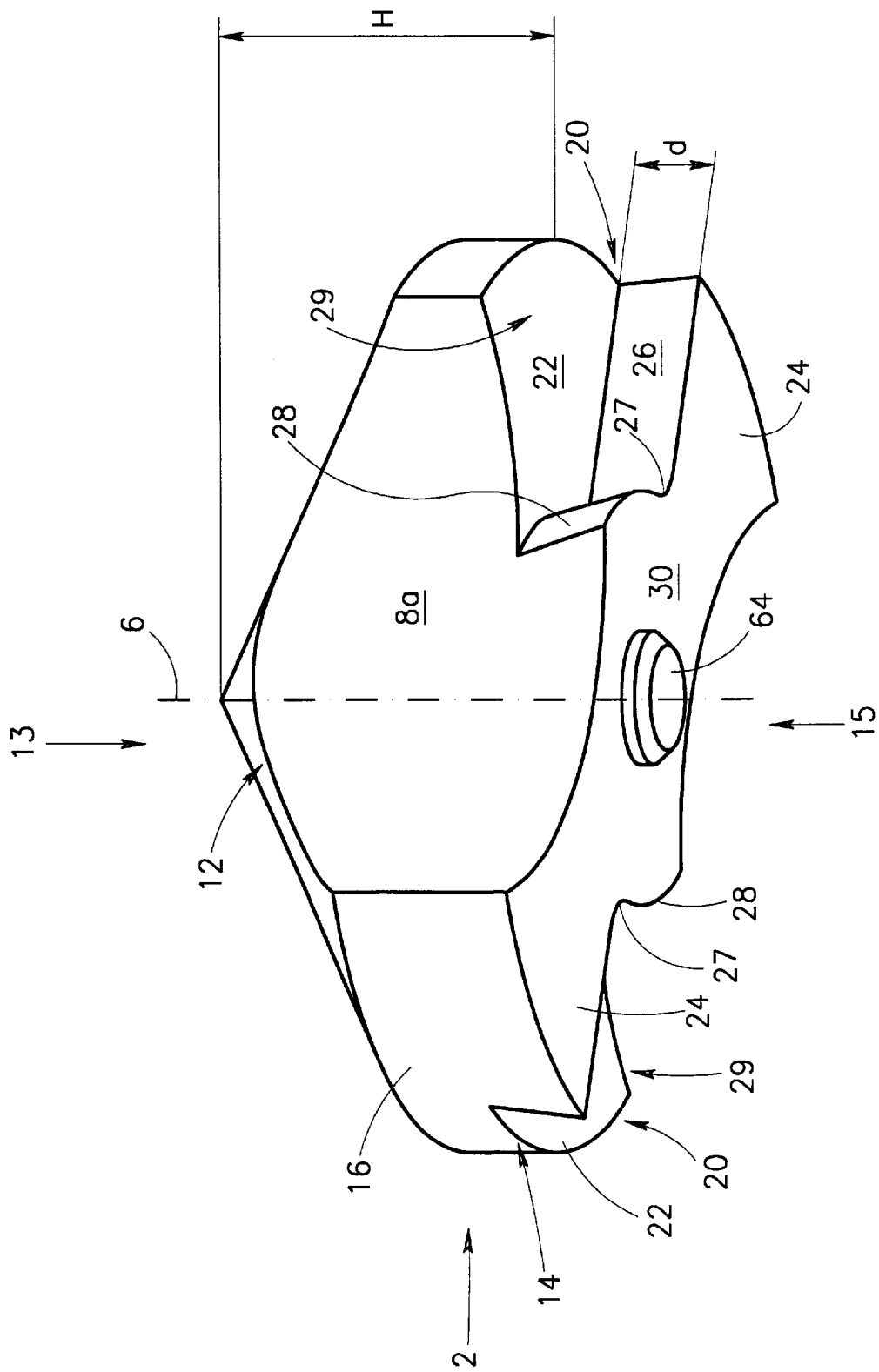
FIG. 2 is an isometric bottom view of a cutting head of the cutting tool assembly shown in FIG. 1.

As illustrated in FIGS. 2 and 3, the cutting head 2 has a cutting portion 12 adjacent the cutting head leading end 13 and a cutting head mounting portion 14 adjacent the cutting head trailing end 15.

The cutting portion 12 of the cutting head will not be described herein since it does not constitute the subject matter of the present invention. However, it should be noted that the cutting portion 12 of the cutting head may have any appropriate design.

As seen in FIG. 2, the cutting head mounting portion 14 has a peripheral surface 16 and comprises a pair of diametrically disposed cutting head coupling portions 20 each bound by the peripheral surface 16 and the chip flute sections 8a and 10a. Each cutting head coupling portion 20 has a single-step configuration with a lowered base surface 22 adjacent one chip flute section 8a, 10a, a raised base surface 24 adjacent the other chip flute section 10a, 8a and an torque transmission wall 26 therebetween, which all extend from the peripheral surface 16 of the cutting head mounting portion 14 towards the longitudinal axis 6. The lowered base surface 22 and the torque transmission wall 26 both terminate at a fixation wall 28 merging with the torque transmission wall 26 via a rounded corner 27 and forming with the lowered base surface 22 and the torque transmission wall 26 a recess 29. The cutting head coupling portions 20 have a central base surface 30 extending therebetween and merging with the raised based surfaces 24 thereof.

As seen in FIG. 2, the lowered, raised and central base surfaces 22, 24 and 30 of the cutting head are substantially planar and are oriented generally perpendicular to the longitudinal axis 6, and the torque transmission wall 26 and the fixation wall 28 are transverse to the base surfaces 22 and 24.

As seen in FIG. 3, the torque transmission wall 26 of each cutting head coupling portion 20 extends generally radially with respect to the longitudinal axis 6 and is acutely inclined relative to the base surfaces 22 and 24. It should be understood that the torque transmission wall 26 does not necessarily need to be a planar surface but rather may be in the form of a curved surface, only a portion of which extends radially. Furthermore, the torque transmission wall 26 may be obtusely inclined or be perpendicular to the base surfaces and may not extend exactly in the radial direction but may rather be oriented at an angle to this direction. An axial dimension d (FIG. 2) of the torque transmission wall 26 of each cutting head coupling portion 20 is substantially less than a distance D (FIG. 3) between the radially outermost points 21' and 21" of the respective chip flutes sections 8a and 10a. The axial dimension d does not exceed and, preferably, is substantially less than half of the distance D and is less than a height H (FIG. 2) of the cutting head 2 measured between the leading end 13 and the lowered base surfaces 24 thereof As seen in FIG. 3, the fixation wall 28 extends circumferentially with respect to the longitudinal axis 6, along the lowered based surface 22. Alternatively, the fixation wall 28 may extend along the entire coupling portion 20 or any portion thereof.

Figure 8:
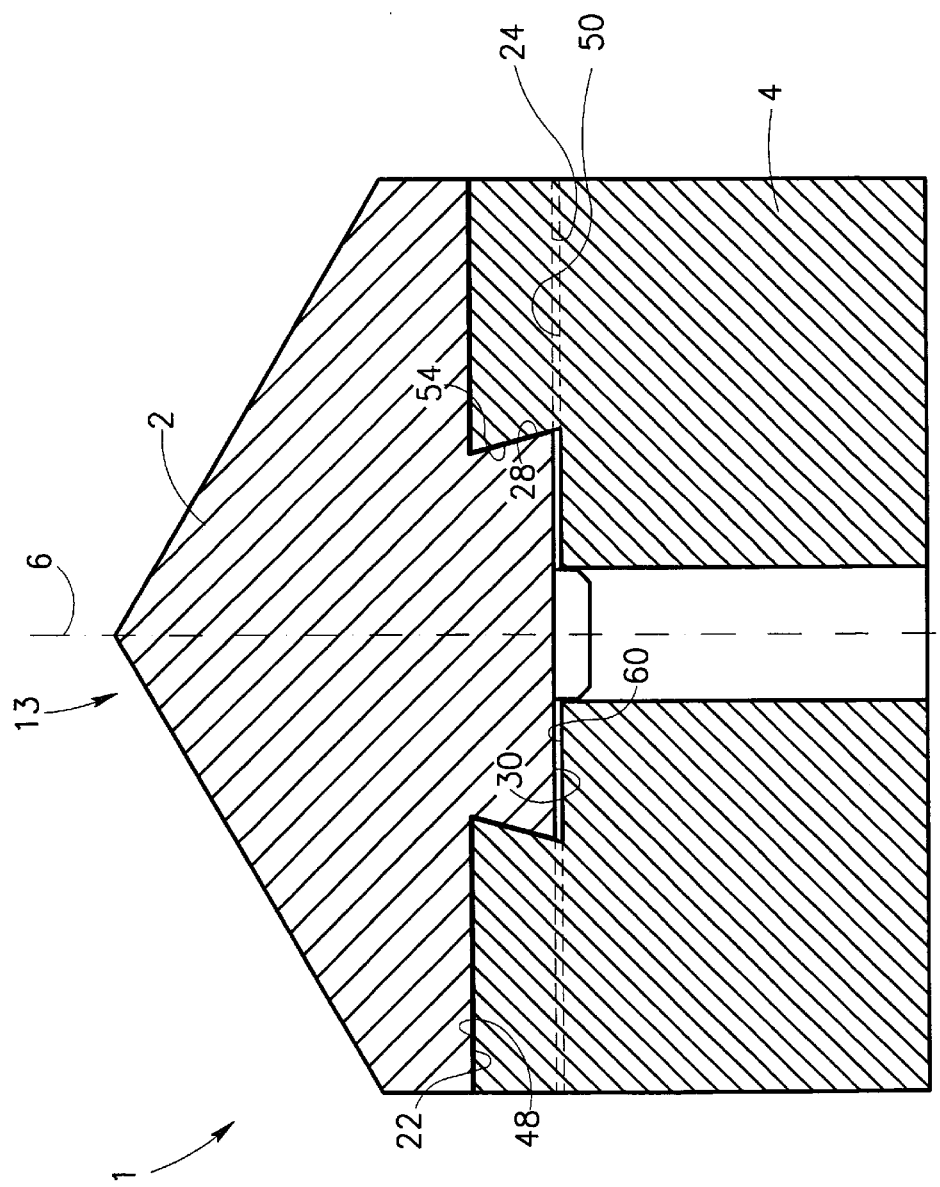
FIG. 8 is a cross-sectional view of the cutting tool assembly shown in FIG. 7.

As may be seen in FIGS. 1, 2, 6 and 7 and best shown in FIG. 8, the fixation walls 28 have the form of dovetail conical surfaces diverging in the direction away from the cutting head leading end 13. These dovetail conical surfaces have an axis (not shown) which coincides with the longitudinal axis 6 and may have various appropriate shapes such, for example, as spiral, elliptical or the like.

Figure 4A:
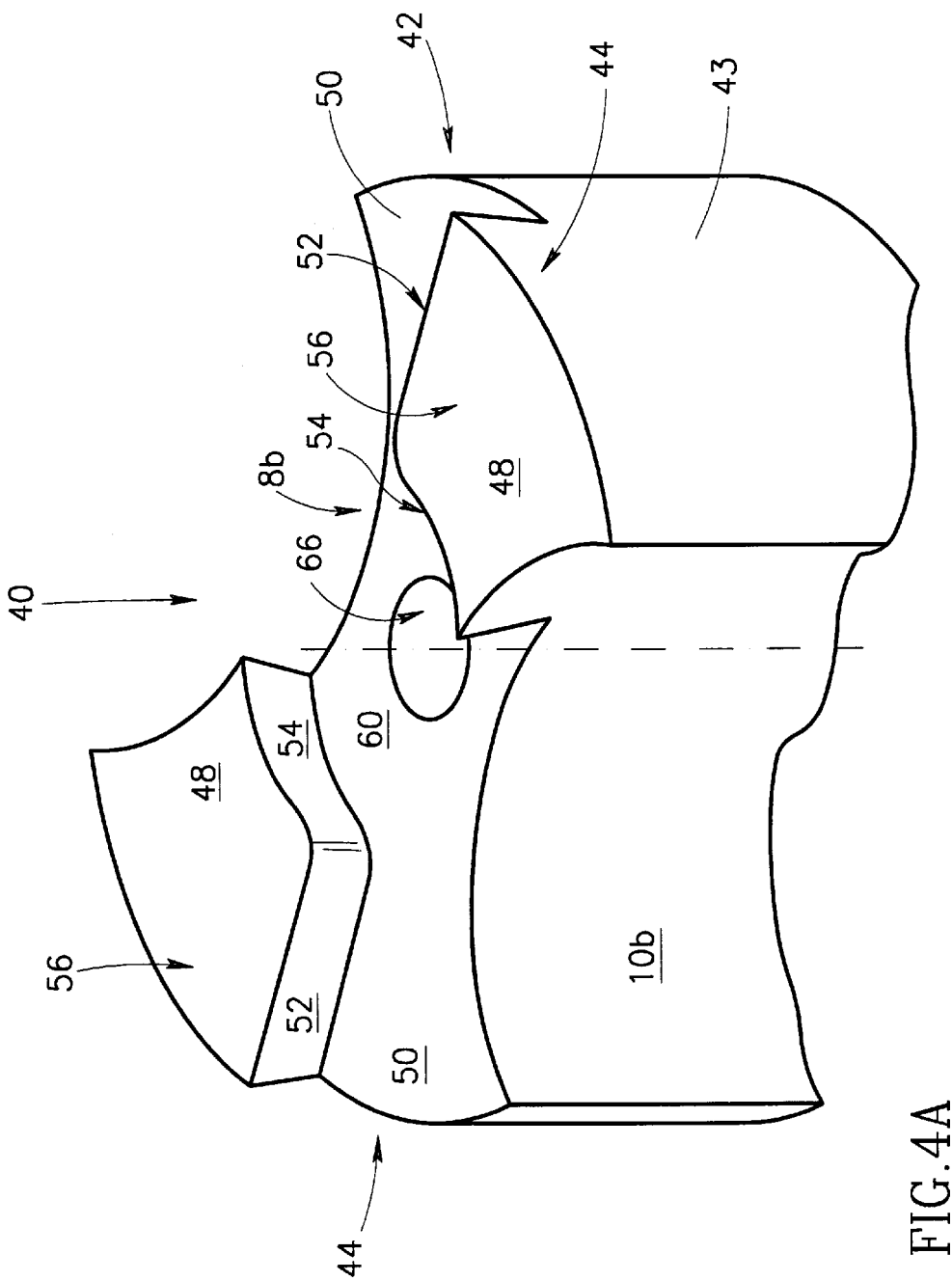
FIG. 4a is an isometric partial view of a tool shank of the cutting tool assembly shown in FIG. 1.
Figure 5:
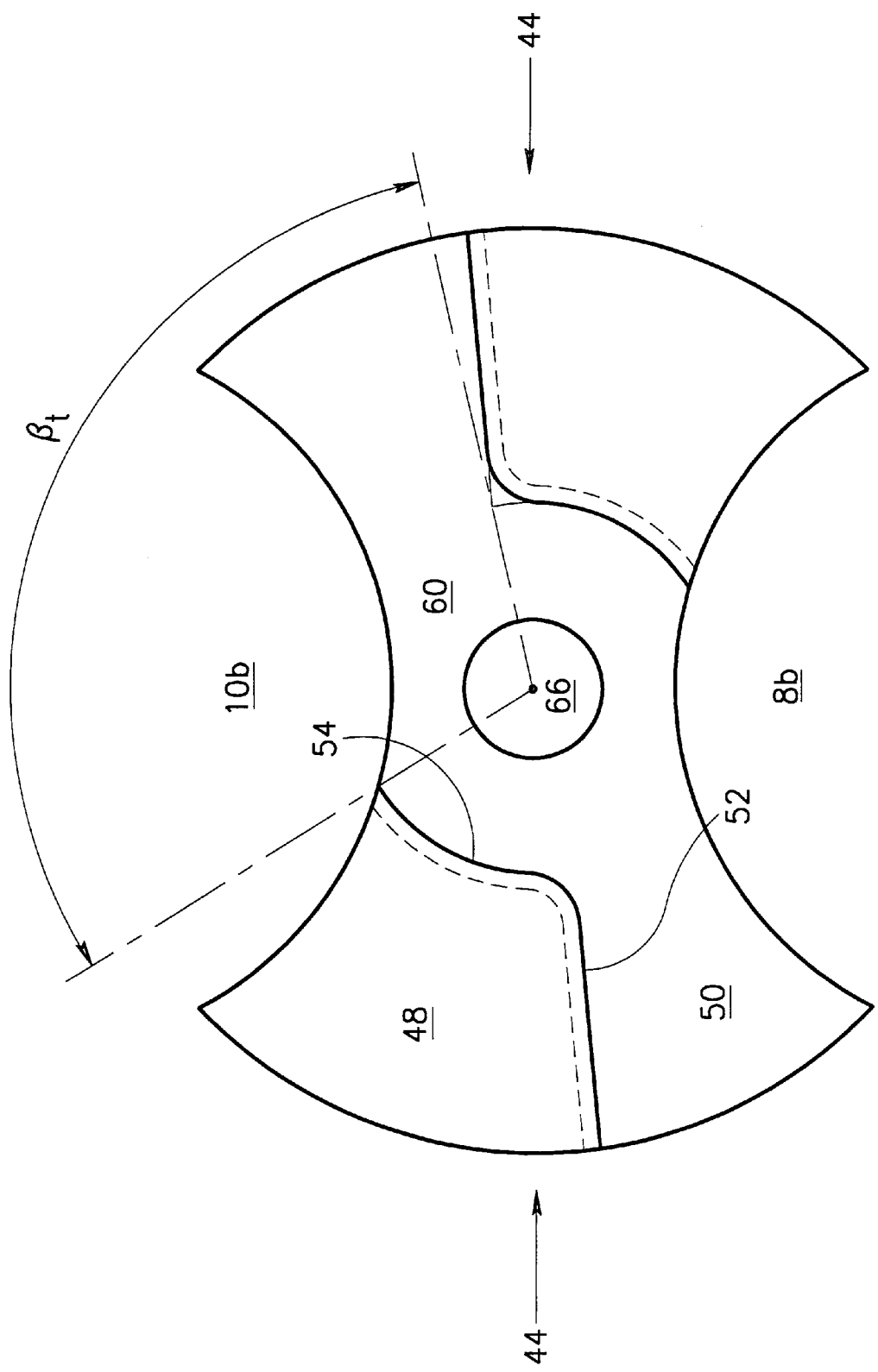
FIG. 5 is a front view of the tool shank shown in FIG. 4.

As shown in FIGS. 4a and 5, the tool shank 4 has a front face 40 with a cutting head receiving portion 42 formed thereon. The cutting head receiving portion 42 having a peripheral surface 43 mating, in shape and dimensions, with the peripheral surface 16 of the cutting head mounting portion 14. The cutting head receiving portion 42 has diametrically disposed tool shank coupling portions 44 mating in shape and dimensions with the cutting head coupling portions 20. Thus, each tool shank coupling portion 44 comprises a raised base surface 48, a lowered base surface 50, an torque transmission wall 52 therebetween and a dovetail fixation wall 54 merging with the torque transmission wall 52. The raised base surface 48 and the torque transmission and fixation walls 52 and 54 define between them protrusions 56 mating with and adapted to be received in the recesses 29 of the cutting head mounting portion 14. The tool shank coupling portions 44 have a central base surface 60 therebetween. The raised, lowered and central base surfaces 48, 50 and 60 and the torque transmission and fixation walls 52 and 54 of the tool shank coupling portions 44 correspond in orientation and dimensions to the respective lowered, raised and central base surfaces 22, 24 and 30 and torque transmission and fixation walls 26 and 28 of the cutting head coupling portions 20, the arrangement however being such that the fixation walls 28 of the cutting head coupling portions 20 have the angular extension $\alpha_c$ (FIG. 3) smaller than an angular distance $\beta_t$ (FIG. 5) between extremities of the fixation walls 54 of the tool shank coupling portions 44.

Figure 4B:
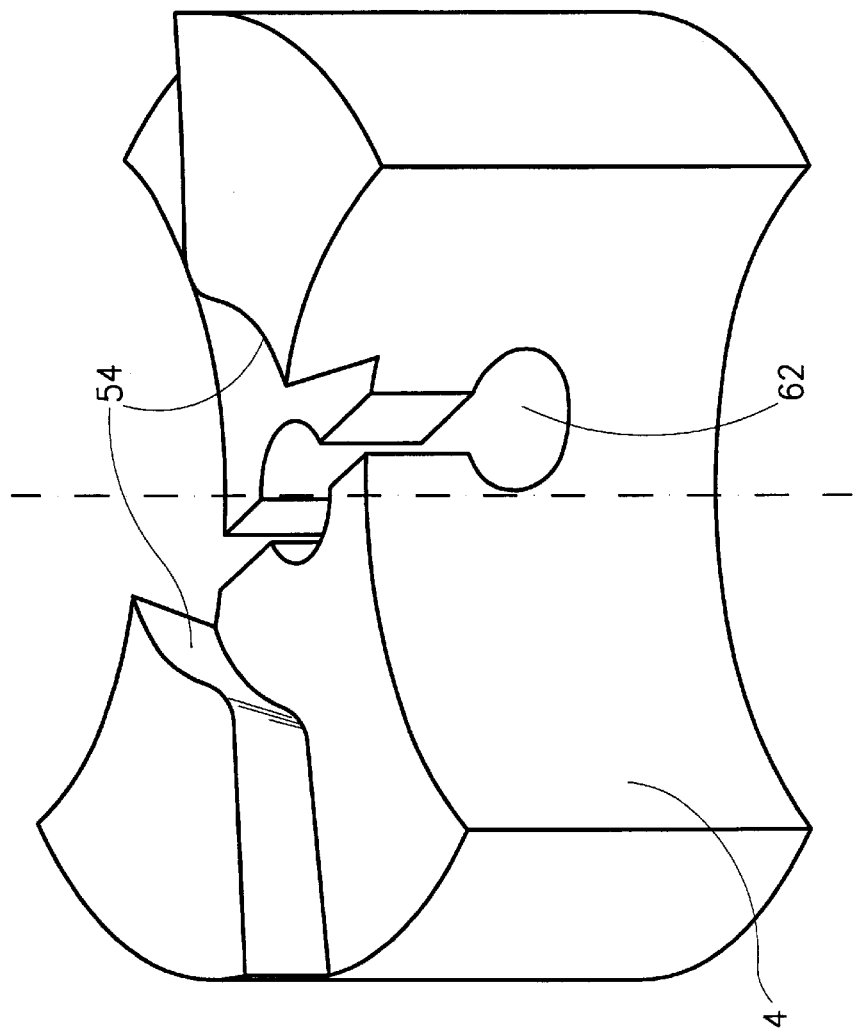

The fixation walls 28 and 54 of the coupling portions 20 and 44 of the respective cutting head 2 and tool shank 4 are designed to have an interference fit therebetween. Such interference fit between the fixation walls 28 and 54 may be alternatively achieved by forming, in the tool holder 4, a resilient slit 62 as shown in FIG. 4b.

As seen in FIGS. 2, 3 and 4a, the cutting head and the tool shank are further provided with respective male and female guiding members 64 (FIG. 2) and 66 (FIG. 4a), which may also be arranged vice versa, for the initial alignment of the cutting head 2 in the tool shank 4.

Figure 6:
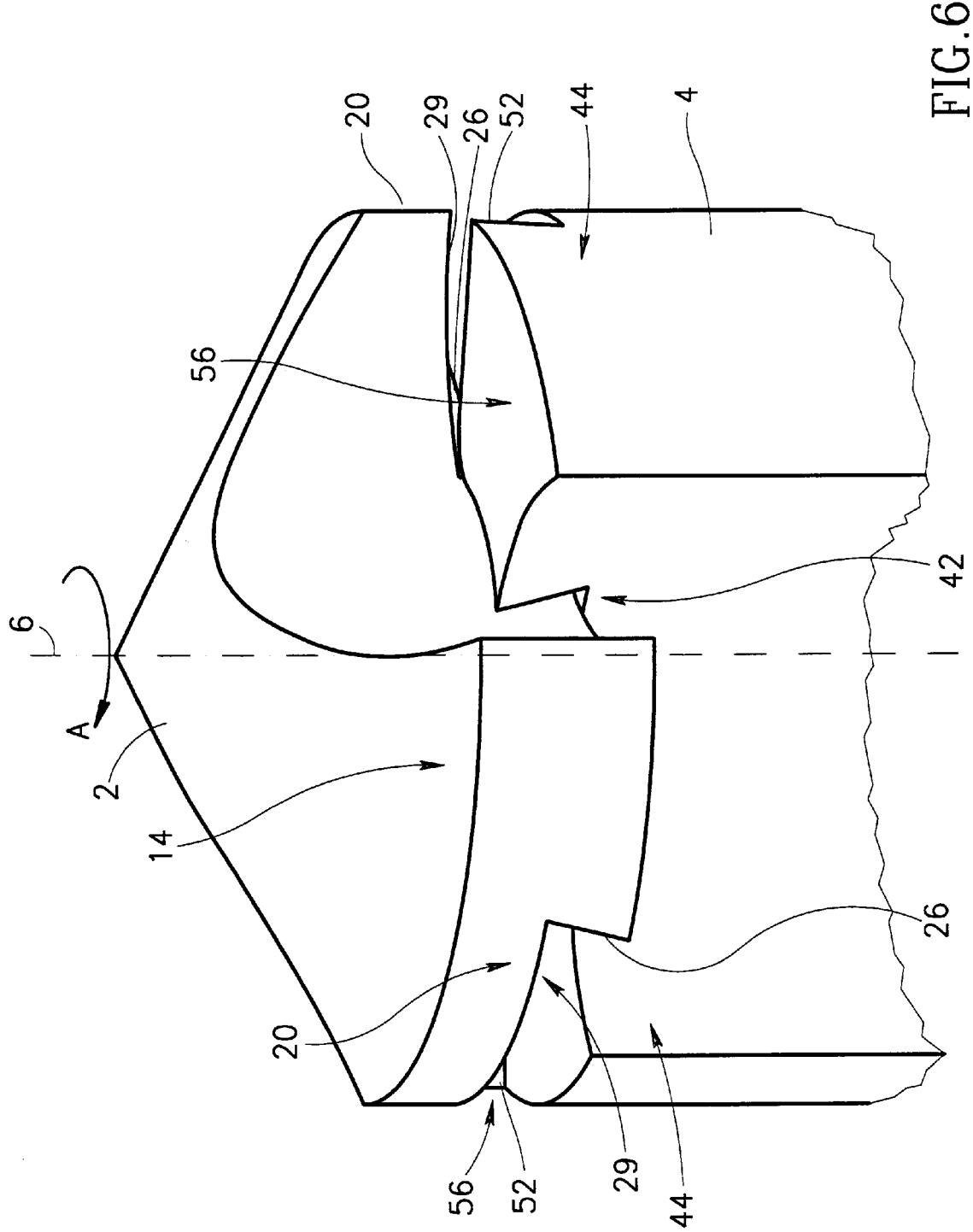
FIG. 6 is an isometric view of the cutting tool assembly as shown in FIG. 1, at an initial stage of its assembling.
Figure 7:
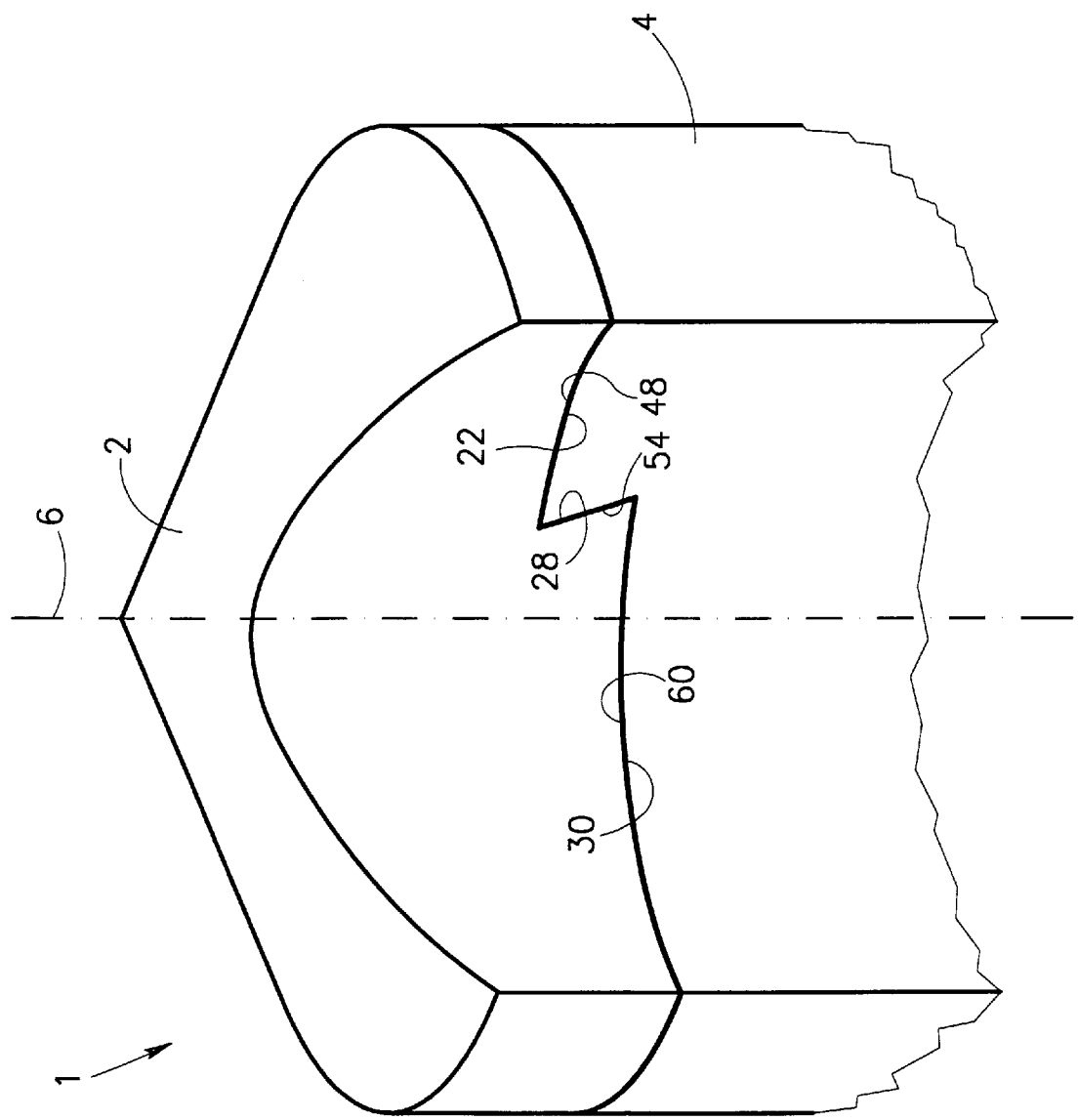
FIG. 7 is an isometric view of the cutting tool assembly as shown in FIG. 1, when assembled.

As illustrated in FIG. 6, the cutting head mounting portion 14 of the cutting head 2 is mounted to the cutting head receiving portion 42 of the tool shank 4 by the transverse insertion of the cutting head coupling portions 20 between the protrusions 56 of the tool shank coupling portions 44, and rotating the cutting head 2 in the direction A (counter the rotation direction of the cutting tool) so that its lowered base surfaces 22 slide along the raised based surfaces 48 of the tool shank coupling portions 44 until the torque transmission walls 26 of the cutting head coupling portions 20 abut the corresponding torque transmission walls 52 of the tool shank coupling portions 44 and the protrusions 56 of the latter coupling portions 44 are fully received in the recesses 29 of the former coupling portions 20, and until the dovetail fixation walls 28 of the cutting head mounting portions 20 engage the corresponding dovetail fixation walls 54 of the tool shank coupling portions 44. In the tool holder shown in FIG. 4a, the engagement between the fixation walls 28 and 54 is obtained due to the resilient broadening of the resilient slit 62.

The cutting tool 1 described above, as assembled, is illustrated in FIGS. 7 and 8. During a cutting operation, a broad axial support of the cutting head 2 in the tool shank 4 is provided by the contact of the lowered base surfaces 22 of the cutting head 2 with the corresponding raised base surfaces 48 of the tool shank 4. In addition, the axial support may be essentially increased by the contact of the raised base surfaces 24 of the cutting head 2 with the lowered base surfaces 50 of the tool shank 4. The fixation walls 28 and 54 of, respectively, the cutting head 2 and the tool shank 4 function as fixation surfaces which interact co-axially in an interlocking male-female fashion and provide for the proper securing of the cutting head on the tool holder during cutting and also preventing the cutting head from being detached from or pulled out of the tool shank when the cutting tool is withdrawn from a workpiece being machined.

FIGS. 9 to 14 illustrate a cutting tool 101 according to another embodiment of the present invention, in which a coupling arrangement is generally similar to that of the cutting tool 1 illustrated in FIGS. 1 to 8, the difference therefrom being in that, in the cutting tool 101, cutting head and tool shank coupling portions have a two-level design with their fixation arrangements being disposed at a different axial level than their base surfaces and torque transmission walls. Therefore, in the description of the cutting tool 101 hereinbelow, only those parts thereof will be referred to, which are relevant to the description of the fixation arrangement.

As seen in FIG. 9, the cutting tool 101 comprises a solid cutting head 102 and a tool shank 104 having a longitudinal axis 106 and two chip flutes (not designated).

Figure 10:
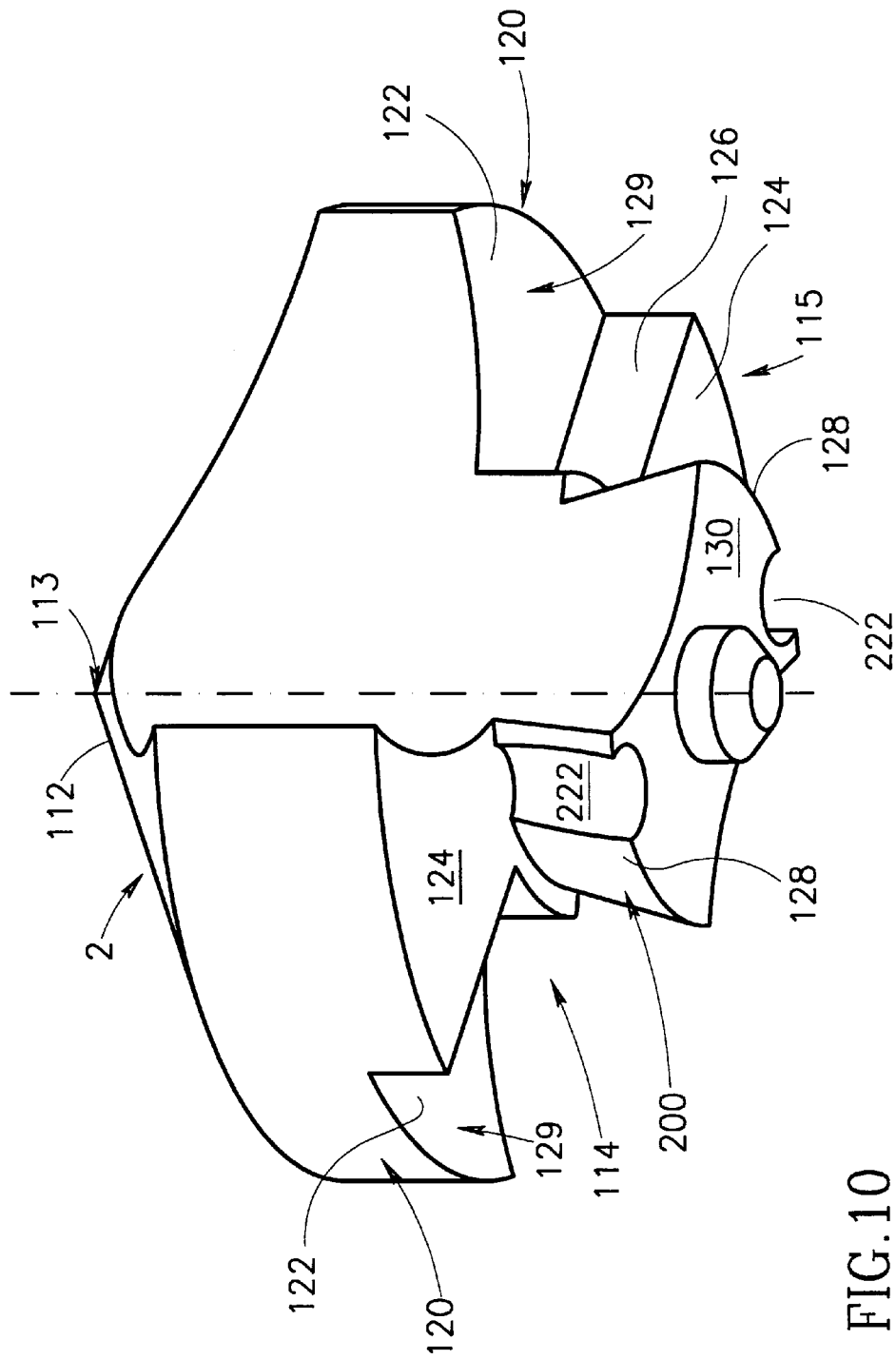
FIG. 10 is an isometric view of a cutting head of the cutting tool assembly shown in FIG. 9.

The cutting head 102 shown separately in FIG. 10, has a cutting portion 112 adjacent the cutting head leading end 113 and a cutting head mounting portion 114 adjacent the cutting head trailing end 115. The cutting head mounting portion 114 comprises a pair of diametrically disposed cutting head coupling portions 120 each having a lowered base surface 122, a raised base surface 124, an torque transmission wall 126 and a recess 129 formed thereby.

Figure 11:
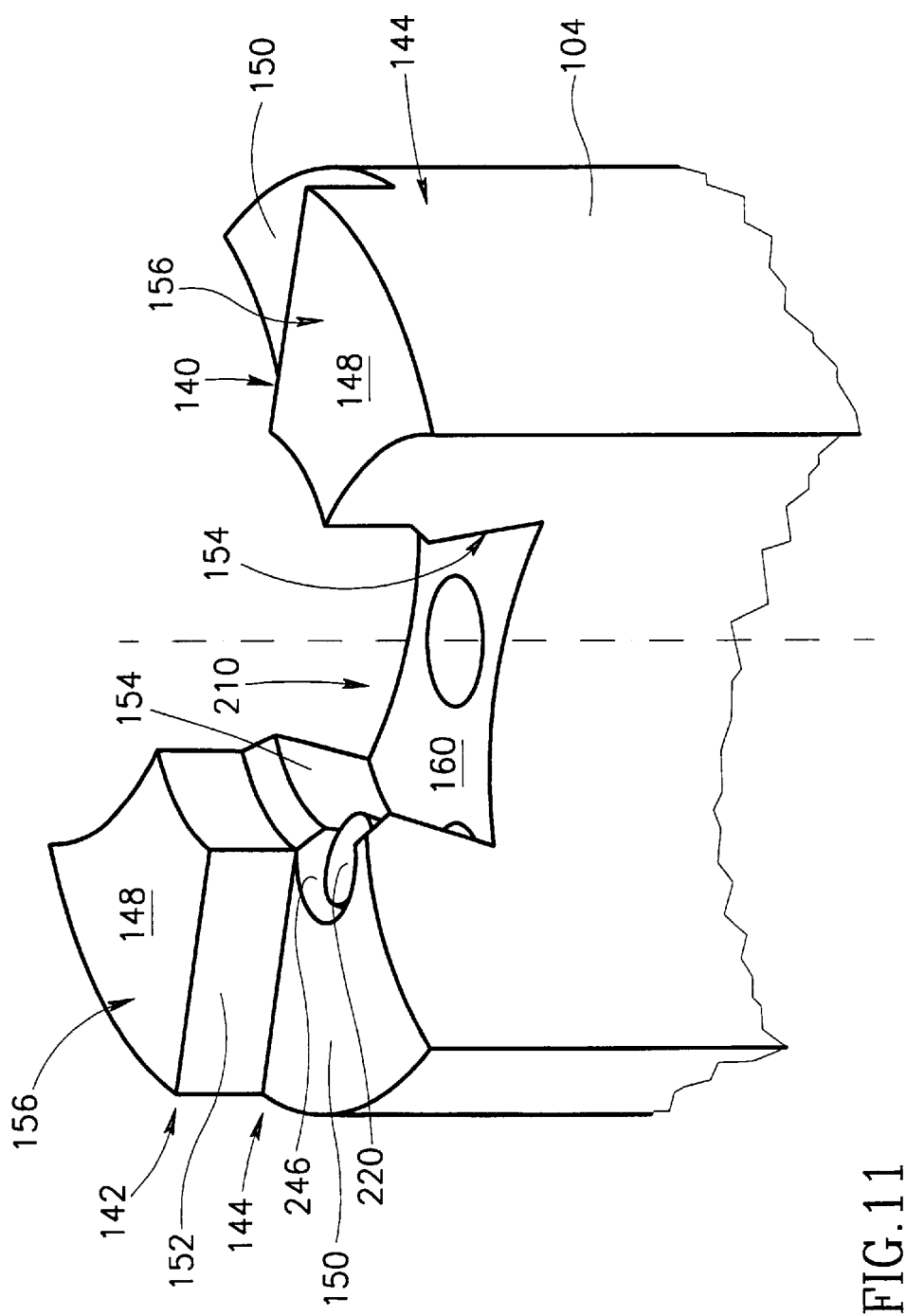
FIG. 11 is a partial isometric view of a tool shank of the cutting tool assembly shown in FIG. 9.

The tool shank 104 shown in FIG. 11 has a front face 140 with a cutting head receiving portion 142 formed thereon. The cutting head receiving portion 142 has tool shank coupling portions 144 with raised base surfaces 148, lowered base surfaces 150, torque transmission walls 152 and protrusions 156 formed thereby and mating in shape and dimensions with the recesses 129 of the cutting head coupling portions 120.

As seen in FIGS. 9, 10 and 11, the cutting tool 101 is provided with male and female fixation members 200 and 210 formed respectively in the cutting head 102 and the tool shank 104 and having radial dimensions substantially less than a radial dimension of the cutting head and the tool shank. The male fixation member 200 of the cutting head 102 protrudes from the trailing end 115 thereof and the female fixation member 210 of the tool shank 104 is recessed with respect to the front face 140 thereof.

As shown in FIGS. 10 and 11, the male and female fixation members 200 and 210 of the cutting tool 101 have respective fixation conical walls 128 and 154 and central base surfaces 130 and 160 therebetween, which have the shape and interact in the fashion similar to that of the respective fixation walls 28 and 54 and central base surfaces 30 and 60 of the cutting head coupling portions 20 and the tool shank coupling portions 44 of the cutting tool 1. In particular, similarly to the the cutting tool 1, the cutting tool 101 has an angular distance between its adjacent extremities of the fixation walls 154 of the tool shank 104 larger than an angular extension of the fixation walls 128 of the cutting head 102. However, the angular extension of the fixation walls 128 in the cutting head 102 is larger than that of the fixation walls 28 of the cutting head 2, and the angular distance between adjacent extremities of the fixation walls 154 of the tool shank 104 is smaller than that between the fixation walls 54 in the tool shank 4. In addition, the raised base surfaces 124 of the cutting head coupling portions 120 of the cutting tool 101 each have an angular extension substantially smaller than the angular distance between the raised base surfaces 148 of the tool shank coupling portions 144 thereof.

Figure 12:
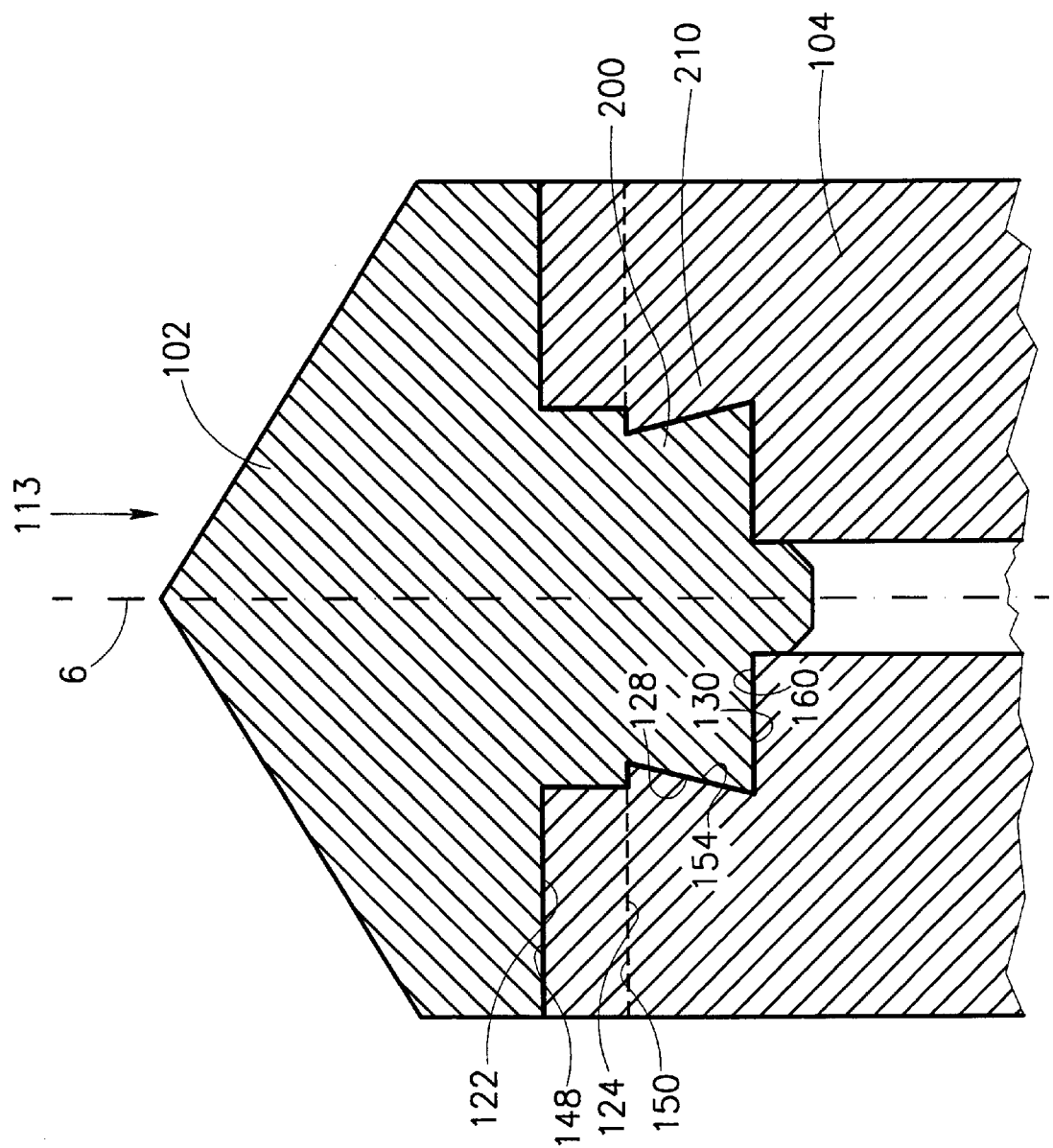
FIG. 12 is a cross-sectional view of the cutting tool assembly shown in FIG. 9, when assembled.

As seen in FIG. 12, the fixation conical walls 128 and 154 of the male and female fixation members 200 and 210 diverge away from the leading end 113 of the cutting head 102 and cooperate in a dovetail manner with a sliding fit therebetween.

Figure 13:
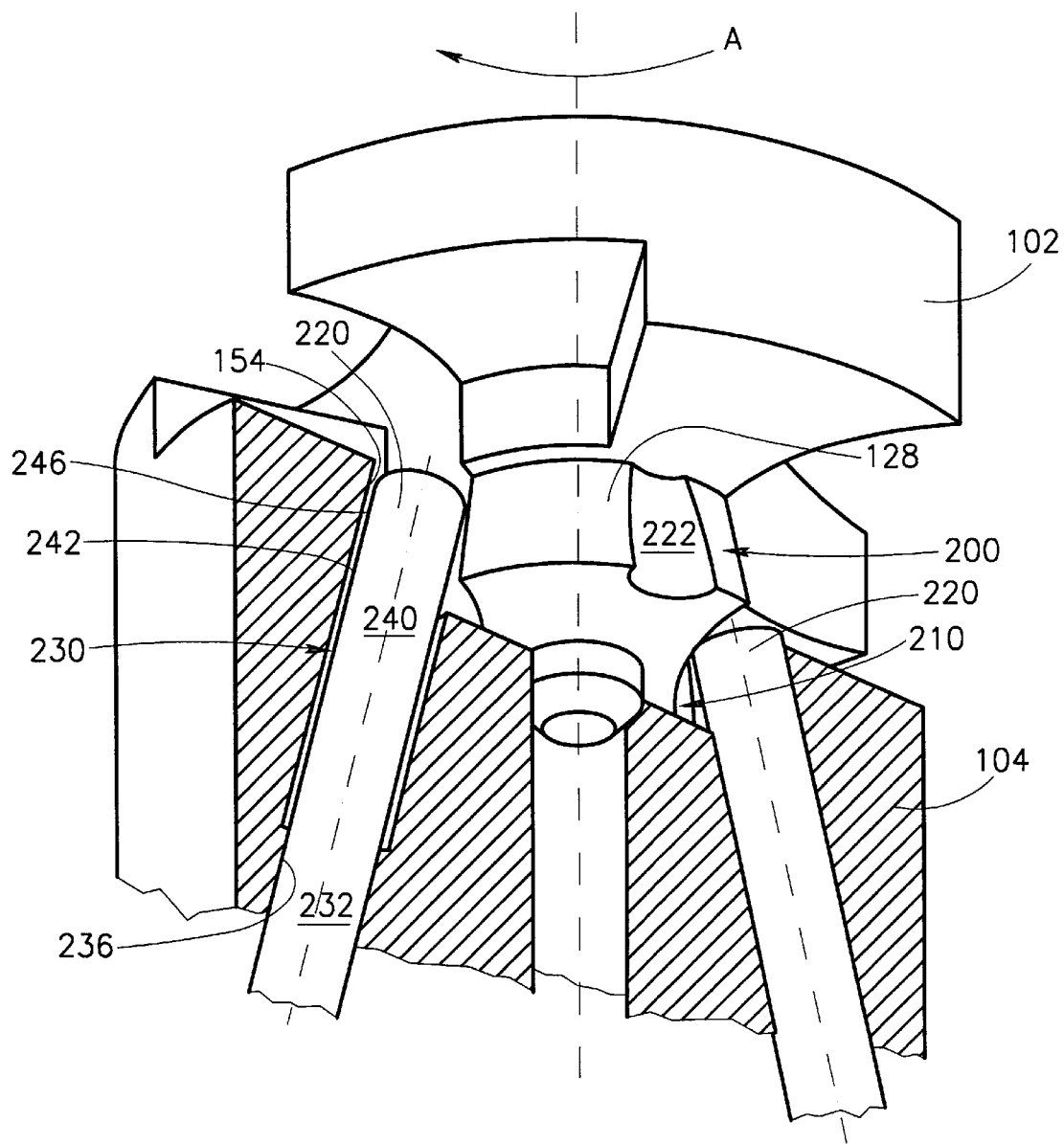
FIG. 13 is an isometric partially cross-sectional view of a cutting tool assembly shown in FIG. 9, at an initial stage of its assembling.

Similarly to the embodiment of the cutting tool 1 in accordance with which the tool shank 4 has a design illustrated in FIG. 4a, the cutting tool 101 may be provided with means for resiliently securing the cutting head on the tool shank. FIGS. 10, 11 and 13 show an alternative example of such securing means.

The securing means comprise two cylindrical locking pins 220 (FIGS. 11 and 13) projecting axially from the central base surface 160 of the female fixation member 200 of the tool shank 104 and disposed adjacent the fixation conical walls 154 thereof and two corresponding cylindrical locking receptacles 222 (FIGS. 10 and 13) formed in the fixation conical walls 128 of the male fixation member 200 of the cutting head 102 and adapted to receive therein the locking pins 220. The locking pins 220 are inclined towards the longitudinal axis 106 such as to be generally co-directional with the diverging fixation conical walls 128 and 154 of the respective male and female fixation members 200 and 210.

As seen in FIG. 13, the locking pins 220 are arranged in the tool shank 104 in a resilient manner which, in the described embodiment, is obtained by mounting each of the locking pins 220 in a stepped elongated bore 230 formed in the tool shank 104 adjacent the fixation conical walls 154 thereof and having two bore sections of different diameters so that a lower portion 232 of the pin 220 fits in a lower narrow section 236 of the bore 230, and an upper section 240 of the pin 220 is surrounded by an upper wide section 242 of the bore 230, the pin being slightly bendable therein.

Thus, when during assembling of the cutting tool 101, the cutting head 102 is inserted in the cutting head receiving portion 142 of the tool shank 104 and rotated in the direction A, the fixation conical walls 128 of the male fixation member 200 slide under the fixation conical walls 154 of the female fixation member 210 and the pins 220 are biased outwardly towards the latter walls 154.

Upon the abutment of the torque transmission walls 126 of the cutting head coupling portions 200 against the torque transmission walls 152 of the tool shank coupling portions 44, the rotation of the cutting head 102 is terminated and the locking pins 220 enter the locking receptacles 222. Thereby, the cutting head 102 is reliably secured in its mounting position on the tool shank 104 by the resilient locking pins 220.

Figure 14:
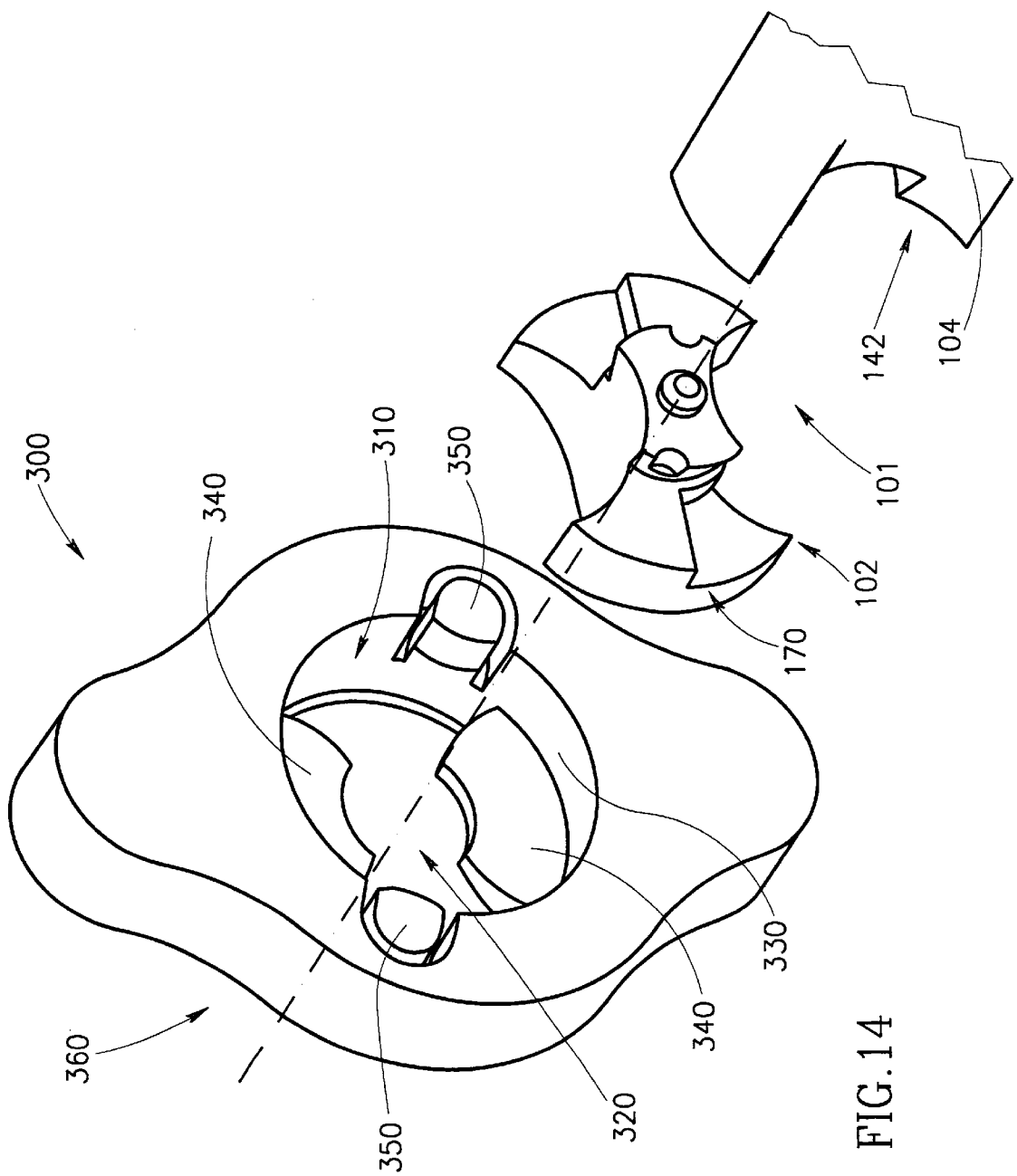
FIGS. 14 and 15 illustrate different embodiments of an assembling device for use with the cutting tool shown in FIGS. 9 to 13.
Figure 15:
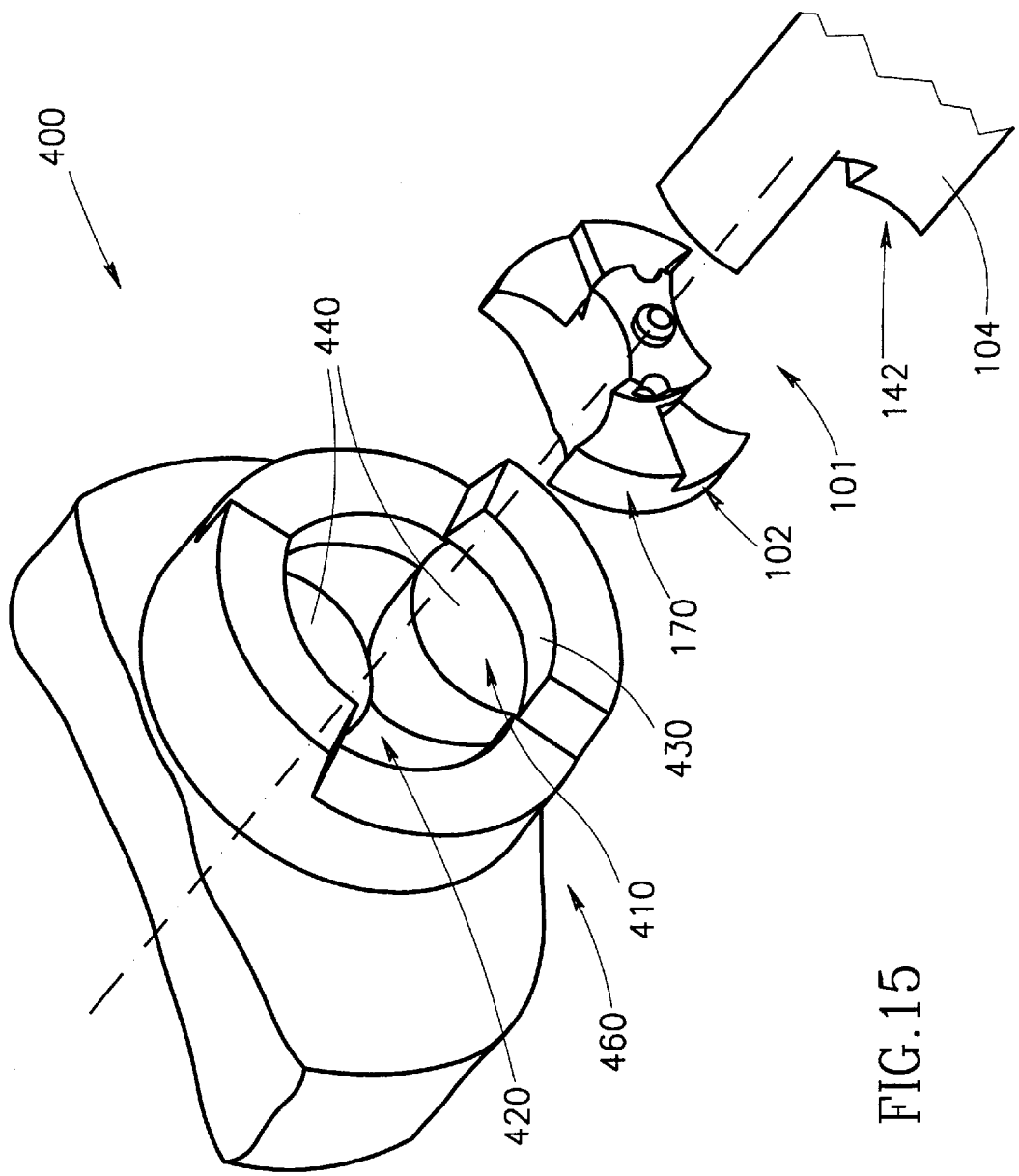

The cutting tools of the present invention may be further provided with an assembling device. Thus, FIGS. 14 and 15 illustrate two embodiments of such a device for use with any of the above-described cutting tools and which will be described hereinbelow with reference to the cutting tool 101. As seen, the assembling device 300 (FIG. 14) and 400 (FIG. 15) each have an elongated cylindrical cavity 310, 410 of a diameter corresponding to the diameter of the cutting tool 101. The assembling devices 300 and 400, or at least their cavities 310 and 410, are made of a suitable material and comprise a cutting head holding section 320, 420 and a tool shank receiving section 330, 430, which are capable of encompassing or holding the cutting head 102 and the cutting head receiving portion 142 of the tool shank 104. The cutting head holding sections 320 and 420 of the cavities 310 and 410 have a shape complementary to an outer configuration of the cutting head 102 and, consequently, comprise convex portions 340 and 440 which are capable of entering the chip flute sections of the cutting head, whereby the rotation thereof relative to the assembling devices 300 and 400 is avoided. The assembling devices 300 and 400 may be further provided with means preventing the cutting head from falling out of the cutting head holding sections 320 and 420 of the devices. Thus, in the assembling device 300 shown in FIG. 14, these means are in the form of flexible elements 350 and, in the assembling device 400 shown in FIG. 15, these means are constituted by the convex elements 440 formed with an appropriate shape and dimensions. Alternatively, or in addition to the above elements 350 and 440, the cutting head holding sections 320 and 420 of the cylindrical cavities 310 and 410 may have a diameter which is slightly less than that of the cutting head 102 to enable the press-seating thereof in the corresponding cutting head holding section. When the cutting tool 101 is dissembled, the cutting head is released from the respective assembling device either by pushing it out of the device 300 at a rear end 360 thereof (FIG. 14), or by pulling it out of the device 400 at a front end 460 thereof.

The cutting tool assembly of the present invention and components thereof may have alternative designs comprising features different from those described above and shown in the drawings. For example, the cutting tool may be formed with more than two chip evacuation flutes or rather it may have no such flutes at all and/or may be provided with locally formed chip evacuation space. In the latter case, the lowered surfaces of the cutting head and the tool shank will occupy the entire area between their raised surfaces. Furthermore, the cutting head mounting portion and the cutting head receiving portion of the tool shank may be formed with more than two coupling portions which may be equally or unequally spaced. Also, the design of the cutting head mounting portion and the cutting head receiving portion of the tool shank, as shown in the drawings, may be applied to these portions vice versa. The securing means used in the cutting tool may have any appropriate design. The cutting tool assembly may be provided with additional features such as, for example, cooling means.

LIST OF REFERENCE NUMERALS

| | |
|---|---|
| 1 | cutting tool assembly in FIGS. 1 to 8 |
| 2 | cutting head |
| 4 | tool shank |
| 6 | longitudinal axis |
| 8a, 10a | chip flute sections of the cutting head |
| 8b, 10b | chip flute sections of the tool shank |
| 12 | cutting portion of the cutting head |
| 13 | leading end of the cutting head |
| 14 | cutting head mounting portion |
| 15 | trailing end of the cutting head |
| 16 | peripheral surface of the cutting head mounting portion |
| 20 | cutting head coupling portions |
| 21', 21" | radially outermost points of the chip flute sections 8a and 10a |
| 22 | lowered base surface of the cutting head coupling portion |
| 24 | raised base surface of the cutting head coupling portion |
| 26 | torque transmission wall of the cutting head coupling portion |
| 27 | rounded corner |
| 28 | fixation wall of the cutting head coupling portion |
| 29 | recess of the cutting head coupling portion |
| 30 | central base surface between the cutting head coupling portions |
| 40 | front face of the tool shank |
| 42 | cutting head receiving portion of the tool shank |
| 43 | peripheral surface of the cutting head receiving portion of the tool shank |
| 44 | tool shank coupling portions |
| 48 | raised base surface of the tool shank coupling portion |
| 50 | lowered base surface of the tool shank coupling portion |
| 52 | torque transmission wall of the tool shank coupling portion |
| 54 | fixation wall of the tool shank coupling portion |
| 56 | protrusion of the tool shank coupling portion |
| 60 | central base surface between the tool shank coupling portions |
| 62 | resilient slit |
| 64, 66 | male and female guiding members |
| 101 | cutting tool assembly in FIGS. 9 to 13 |
| 102 | cutting head |
| 104 | tool shank |
| 106 | longitudinal axis 106 |
| 112 | cutting portion of the cutting head |
| 113 | cutting head leading end |
| 114 | cutting head mounting portion |
| 115 | cutting head trailing end |
| 120 | cutting head coupling portion |
| 122 | lowered base surface of the cutting head coupling portion |
| 124 | raised base surface of the cutting head coupling portion |
| 126 | torque transmission wall of the cutting head coupling portion |
| 128 | fixation conical walls of the male fixation member |
| 129 | recess of the cutting head coupling portion |
| 130 | central base surface of the male fixation member |
| 140 | front face of the tool shank |
| 142 | cutting head receiving portion of the tool shank |
| 144 | tool shank coupling portion |
| 148 | raised base surface of the tool shank coupling portion |
| 150 | lowered base surface of the tool shank coupling portion |
| 152 | torque transmission wall of the tool shank coupling portion |
| 154 | fixation conical walls of the female fixation member |
| 160 | central base surface of the female fixation member |
| 156 | protrusions of the tool shank coupling portions |
| 200 | male fixation member of the cutting head |
| 210 | female fixation member of the tool shank |
| 220 | locking pins |
| 222 | locking receptacles |
| 230 | elongated bores |
| 232 | lower portion of the pin 220 |
| 236 | lower, narrow section of the bore 230 |
| 240 | upper section of the pin 220 |
| 242 | upper wide section of the bore 230 |
| 246 | cylindrical depression formed in the peripheral walls 152 |
| 300 | assembling device shown in FIG. 14 |
| 310 | cavity of the assembling device 300 |
| 320 | cutting head holding section of the assembling device 300 |
| 330 | tool shank receiving section of the assembling device 300 |
| 340 | convex portions of the assembling device 300 |
| 350 | flexible elements of the assembling device 300 |
| 360 | rear end of the assembling device 300 |
| 400 | assembling device shown in FIG. 15 |
| 410 | cavity of the assembling device 400 |
| 420 | cutting head holding section of the assembling device 400 |
| 430 | tool shank receiving section of the assembling device 400 |
| 440 | convex portions of the assembling device 400 |
| 460 | front end of the assembling device 400 |

I claim:

1. A cutting tool assembly for rotary cutting operations comprising a replaceable cutting head and a tool shank, having a common longitudinal axis and mating peripheral surfaces;

said cutting head having a cutting portion adjacent a leading end and a cutting head mounting portion adjacent a trailing end thereof, and said tool shank having a cutting head receiving portion formed at a front face thereof, said cutting head mounting portion and the cutting head receiving portion of the tool shank each having at least two coupling portions, the cutting head coupling portions and the tool shank coupling portions being bound by said peripheral surfaces and mating in shape and dimensions;

each coupling portion having a base surface extending transversely to said longitudinal axis and adapted for participating in an axial support of the cutting head in the tool shank, a torque transmission wall extending in a generally radial direction relative to said longitudinal axis and oriented transversely to said base surface, and a fixation wall disposed adjacent and extending transversely to the torque transmission wall and circumferentially relative to said longitudinal axis, the fixation wall of each cutting head coupling portion having an angular extension smaller than a corresponding angular distance between adjacent extremities of the fixation walls of two different tool shank coupling portions;

the cutting head coupling portions being insertable between the tool shank coupling portions into a first position, and being rotatable therefrom into a second position in which the cutting head coupling portions fully overlie the corresponding tool shank coupling portions with their base surfaces and torque transmitting walls abutting each other and their fixation walls co-axially interacting in an interlocking male-female fashion, providing thereby the self-clamping of the cutting head on the tool shank.

2. A cutting tool assembly according to claim 1, wherein the cutting head coupling portions and the tool shank coupling portions have mating stepped configurations, each having a pair of base surfaces of which one surface is raised and the other one is lowered, the base surfaces merging via said torque transmission wall.

3. A cutting tool assembly according to claim 2, wherein the lowered base surfaces of the cutting head coupling portions belong to recesses formed at the trailing end of the cutting head, and the raised base surfaces of the tool shank coupling portions belong to protrusions formed at the front face of the tool shank, the recesses being relatively shallow and the protrusions being relatively short in height with respect to the circumferential extension of the associated coupling portion.

4. A cutting tool according to claim 1, wherein said tool shank is formed with at least two chip flutes.

5. A cutting tool assembly according to claim 4, wherein said cutting head is formed with chip flute sections which merge continuously with the chip flutes formed in the tool shank.

6. A cutting tool according to claim 5, wherein each coupling portion extends between the two flutes so that its lowered surface is disposed adjacent one of the flutes and its raised surface is disposed adjacent the other flute.

7. A cutting tool assembly according to claim 3, wherein said tool shank is formed with chip flutes and said cutting head is formed with chip flute sections which merge continuously with the chip flutes formed in the tool shank, the recesses and the protrusions of the respective cutting head coupling portions and tool shank coupling portions being each bound, on their one side, by an adjacent flute, on their other side, by said torque transmission wall.

8. A cutting tool according to any one of claims 1 to 7 wherein the tool is a rotary cutting tool with said longitudinal axis being the rotary cutting tool's axis of rotation.

9. A cutting tool according to claim 8 wherein the tool is a drilling tool with said cutting portion having a shape tapering towards said leading end of the cutting tool.

10. A replaceable cutting head for mounting on a tool shank along a longitudinal axis thereof, said tool shank having a front cutting head receiving portion formed with at least two coupling portions each bound by a tool shank peripheral surface and formed with a base surface, a torque transmission wall and a fixation wall;

said cutting head having a peripheral surface mating with said tool shank peripheral surface, a cutting portion adjacent a leading end and a cutting head mounting portion adjacent a trailing end thereof, the cutting head mounting portion being formed with at least two coupling portions bound by said peripheral surface of the cutting head;

each coupling portion of the cutting head having a base surface extending transversely to said longitudinal axis and adapted for participating in an axial support of the cutting head in the tool shank, a torque transmission wall extending in a generally radial direction relative to said longitudinal axis and oriented transversely to said base surface, and a fixation wall disposed adjacent and extending transversely to the torque transmission wall and circumferentially relative to said longitudinal axis, the fixation wall of each cutting head coupling portion having an angular extension smaller than a corresponding angular distance between adjacent extremities of the fixation walls of two different tool shank coupling portions.

11. A cutting head according to claim 10, wherein the cutting head coupling portions have a stepped configuration, having a pair of base surfaces of which one surface is raised and the other one is lowered, the base surfaces merging via said torque transmission wall.

12. A cutting head according to claim 10, wherein a body of said cutting head is solid.

13. A device for assembling and disassembling of the cutting tool assembly according to claim 1, comprising:

an elongated cylindrical cavity of a diameter corresponding to a diameter of said cutting tool assembly, at least said cavity being made of an elastic material, the cavity comprising a cutting head holding section and a tool shank receiving section, which sections are capable of resiliently encompassing the cutting head and the cutting head receiving portion of the tool shank, the head holding section having a shape complementary to an outer configuration of the cutting head, whereby the rotation thereof relative to the assembling device is avoided, and being provided with means preventing the cutting head from falling out of the cutting head holding section of the assembling device.

14. A cutting head according to claim 11, wherein the cutting head is formed with chip flute sections, at least one of said coupling portions extending between two neighboring chip flute sections with said lowered base surface thereof being disposed adjacent one of the chip flute sections and said raised base surface thereof being disposed adjacent the other chip flute section.

15. A cutting head according to claim 11, wherein the lowered base surfaces of the cutting head coupling portions belong to recesses formed at the trailing end of the cutting head, the recesses being relatively shallow with respect to the circumferential extension of the associated coupling portion.

16. A cutting head according to claim 15, wherein the recesses of the cutting head coupling portions are each bound, on their one side, by an adjacent flute, and on their other side, by said torque transmission wall.

17. A cutting head according to claim 10, wherein said cutting head is formed with chip flute sections which merge continuously with chip flutes formed in the tool shank.

18. A cutting head according to claim 10, wherein said fixation wall of each cutting head coupling portion slopes towards the longitudinal axis in the direction of said leading end of the cutting head.

19. A cutting head according to claim 10, wherein said base surface of each coupling portion adapted for participating in an axial support of the cutting head in the tool shank, extends between a corresponding peripheral surface of the coupling portion and a location thereof spaced from said longitudinal axis.

20. A cutting head according to claim 19, wherein said base surface has a radial extension which is not less than half a radius of the cutting tool.

21. A cutting tool according to claim 1, wherein said fixation wall of each cutting head coupling portion slopes towards the longitudinal axis in the direction of said leading end of the cutting head.

22. A cutting tool according to claim 1, wherein said base surface of each coupling portion adapted for participating in an axial support of the cutting head in the tool shank, extends between a corresponding peripheral surface of the coupling portion and a location thereof spaced from said longitudinal axis.

23. A cutting tool according to claim 22, wherein said base surface has a radial extension which is not less than half a radius of the cutting tool.

* * * * *